United States Patent [19]

Liechty et al.

[11] Patent Number: 5,435,056
[45] Date of Patent: Jul. 25, 1995

[54] PISTON RING APPARATUS

[75] Inventors: Deryll L. Liechty, Berne; Michael R. Werling, Decatur; Jerry D. Sommer, Berne, all of Ind.

[73] Assignee: Micro-Precision Operations, Inc., Borne, Ind.

[21] Appl. No.: 138,461

[22] Filed: Oct. 15, 1993

[51] Int. Cl.⁶ .............................................. B23Q 7/10
[52] U.S. Cl. ................................ 29/771; 29/888.044; 29/453; 29/709; 29/222; 29/269; 29/467
[58] Field of Search ................. 29/771, 791, 709, 720, 29/467, 222, 224, 235, 888.04, 888.044, 451, 453, 269

[56] References Cited

U.S. PATENT DOCUMENTS

| | | | |
|---|---|---|---|
| 2,792,625 | 5/1957 | Hoffman | 29/222 X |
| 4,379,234 | 4/1983 | Cruz | 29/222 X |
| 4,967,459 | 11/1990 | Garnier | 29/222 |

*Primary Examiner*—Timothy V. Eley
*Assistant Examiner*—Khan V. Nguyen
*Attorney, Agent, or Firm*—Edward J. Timmer

[57] ABSTRACT

Piston-ringing apparatus comprises a tubular piston nest member for receiving each piston to locate the piston groove in a predetermined ring-receiving position, a plurality of ring cartridges positionable one at a time in alignment with the piston nest member. The aligned ring cartridge is engaged to the piston nest member to permit transfer of rings from the ring cartridge to the piston nest member and disengage the aligned ring cartridge when empty of rings. The stack of rings on the cartridge is moved by opposing fingers toward the piston groove to position an endmost ring residing on the nest member in the groove of each successive piston received in the nest member while the aligned ring cartridge is engaged thereto. A fiber optic switch is provided for directing a light beam tangentially through the piston groove to determine whether a ring is positioned therein. The switch provides a finger motor drive signal to stop feeding of a ring to the piston groove when a ring is present in the piston groove. When the aligned ring cartridge empty of rings is disengaged from the piston nest member for replacement by another ring cartridge full of rings, the opposing fingers are operable to move the stack of rings residing only on the nest member to position an endmost ring thereof in the groove of each successive piston received in the nest member. In this way, there is no interruption in the ringing of successive pistons when the aligned ring cartridge is disengaged from the nest member for replacement.

14 Claims, 10 Drawing Sheets

PISTON RING APPARATUS

FIELD OF THE INVENTION

The present invention relates to piston-ringing apparatus for high volume assembly of compression, expander or other rings in circumferential grooves of pistons for internal combustion engines.

BACKGROUND OF THE INVENTION

Compression and expander rings are widely used in the assembly of pistons for internal combustion engines. Compression rings typically are made of cast iron or steel and precision ground so as to be nearly perfectly flat and thus resistant (stiff) to bending out of a flat profile. Compression rings can be from 3 mm to 1 mm in thickness and have square or radiused inner diameters.

Expander rings, on the other hand, typically are made of stainless steel and include vertical and/or horizontal corrugations. Expander rings are relatively flimsy and easily bendable out of a flat profile as compared to compression rings during the assembly operation into the respective piston grooves. Expander rings can be from 4 mm to 1 mm in thickness.

Internal combustion engine pistons typically have several rings positioned in respective circumferential grooves proximate the closed (domed) end of the piston. For example, a typical internal combustion engine piston will include an inner expander ring with so-called rail rings on opposite sides thereof in the same groove, an intermediate cast iron compression ring, and cast iron or steel outer compression ring proximate the closed (domed) end of the piston.

There is a need for piston ringing apparatus that can be used to assemble the compression and expander rings onto internal combustion engine pistons at one or more piston ringing stations under high volume production conditions where lengthy interruptions or downtime in the piston ringing operation due to the need to supply rings to the ringing station(s) is avoided.

There also is a need for piston ringing apparatus that can be used to assemble compression and expander rings onto internal combustion engine pistons at one or more piston ringing stations and that can be further automated in a manner that improves the assembly rate and reliability of ring/piston assembly.

It is an object of the invention to satisfy these needs.

SUMMARY OF THE INVENTION

The present invention provides apparatus for assembling a ring on each of successive pistons, wherein the apparatus comprises a piston nest member for engaging each piston in a manner to locate the piston groove in a predetermined ring-receiving position. The piston nest member includes an outer periphery for storing a stack of rings end-to-end thereon and includes an annular first end proximate to which a piston groove is positioned when each piston is engaged to the piston nest member and a second end remote from the first end. A plurality of ring cartridges each including a stack of rings end-to-end along its length are provided.

The apparatus includes means for positioning one of the ring cartridges at a time in alignment with the piston nest member. The aligned ring cartridge and the piston nest member are relatively moved by suitable means to engage the aligned ring cartridge with the second end of the piston nest member to permit transfer of rings from the aligned ring cartridge to the piston nest member and to disengage the aligned ring cartridge when empty of rings.

The apparatus further includes means for moving the stack of rings along the aligned ring cartridge toward the first end of the piston nest member to position an endmost ring residing on the outer nest periphery in the groove of each successive piston when the aligned ring cartridge is engaged thereto. However, when the aligned ring cartridge empty of rings is disengaged from the nest member for replacement by another ring cartridge full of rings, the ring moving means remains operable to move the remaining stack of rings residing on the outer nest periphery to position an endmost ring thereof in the groove of each successive piston. In this way, there is no interruption in the ringing of successive pistons when the aligned ring cartridge is disengaged from the piston nest member for replacement with a ring cartridge full of rings.

In one embodiment of the invention, the piston nest member comprises a tubular member having an open, recessed end defining the first end and spacer means disposed in the first end for engaging an end of the piston received in the recessed end to position the piston groove in the ring-receiving position.

In another embodiment of the invention, the means for positioning one of the ring cartridges in alignment with the piston nest member comprises a rotatable carousel having a plurality of ring cartridges disposed thereon and rotatable to successively align one of the ring cartridges thereon with the piston nest member.

In another embodiment of the invention, the means for relatively moving the ring cartridge and the piston nest member comprises a lifting mechanism for raising/lowering the aligned ring cartridge to engage/disengage from the piston nest member.

In still another embodiment of the invention, the means for moving the rings on the ring cartridge and on the nest periphery comprises opposing ring-moving fingers for engaging the end of the stack of rings on the respective ring cartridge or nest periphery and motor means for moving the fingers toward the first end of the piston nest member. The opposing fingers preferably are disposed on a platform movable along the longitudinal axes of the ring cartridge and the piston nest member. Means is disposed on the platform for moving the fingers toward/away from the cartridge and piston nest member to engage/disengage the end of the ring stack thereon.

In still a further embodiment of the invention, the apparatus further includes fiber optic switch means for directing a light beam through a portion of the piston groove at the ring-receiving position to determine whether a ring is positioned in the piston groove. The switch means provides a signal to deactuate the motor means to stop feeding of the stack of rings toward the first nest end when a ring is positioned in the piston groove.

The present invention thus also provides apparatus for assembling a ring on each of successive pistons wherein means is provided proximate a piston ringing station for directing a light beam through a portion of the piston groove for determining whether a ring is positioned in said groove. Preferably, the light beam is directed tangentially relative to the circumference of the groove by first and second fiber optic members.

The aforementioned objects and advantages of the present invention will become more readily apparent

DETAILED DESCRIPTION

Figure 1:
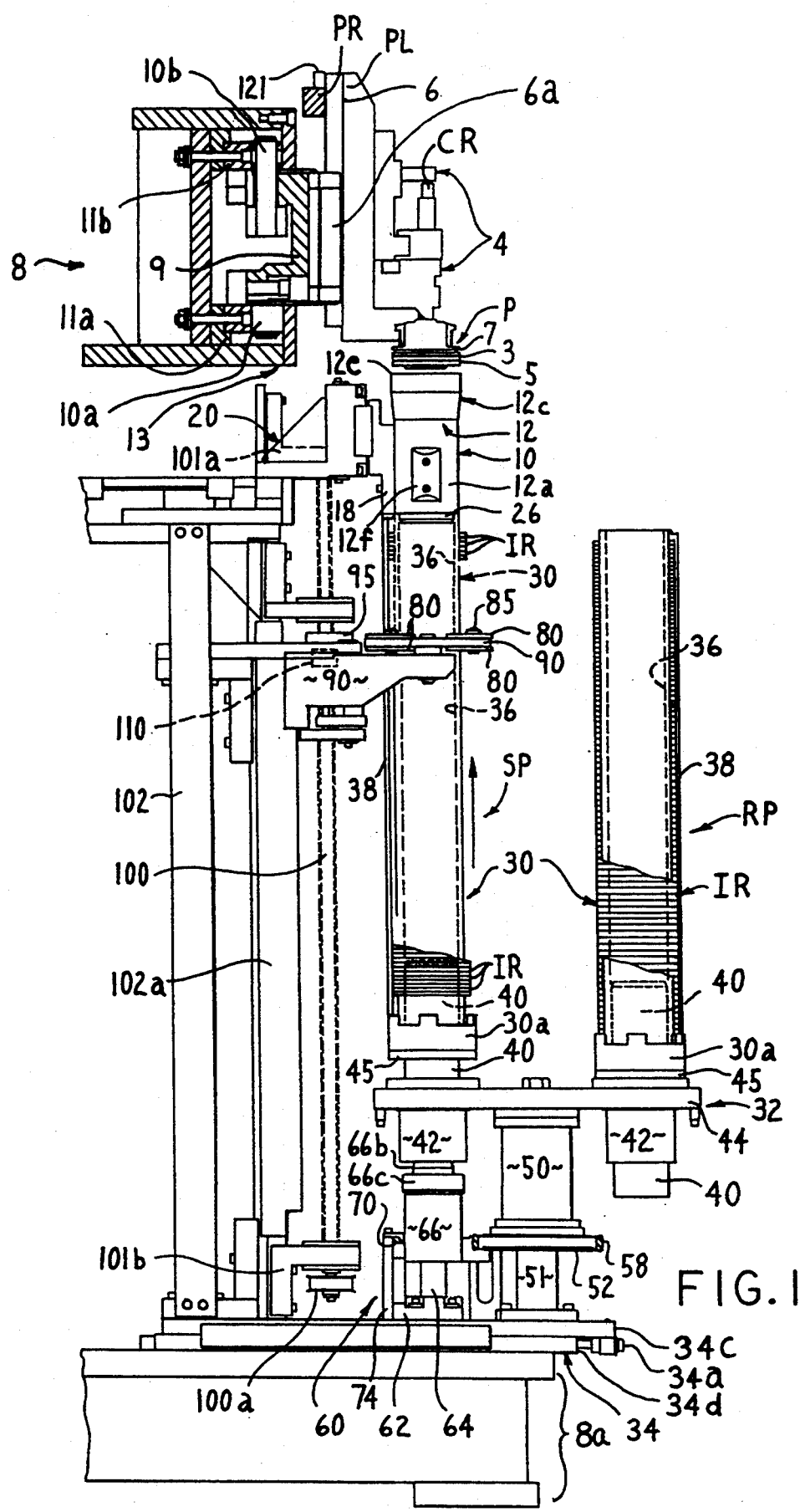
FIG. 1 is a side elevation of one embodiment of the apparatus of the invention for ringing a piston.

Referring to FIG. 1, a ringing apparatus (ringing station) in accordance with one embodiment of the invention is shown for assembling an intermediate cast iron compression ring IR into an intermediate circumferential groove 3 of each of successive internal combustion engine pistons P (only one piston shown). Although the invention is illustrated with respect to assembly of a compression ring in a piston groove, the invention is not so limited and generally can be practiced to install other types of rings in a piston groove.

Each piston P is fixtured by suitable fixture members 4 on a pallet PL that is mounted on a slide 6 that, in turn, is transported on a piston carousel 8. The fixture members 4 engage and fixture the connecting rod CR connected to the piston P to position the piston P in an inverted orientation as shown.

Each slide 6 is attached via a slide bearing block 6a on a cast iron link or plate 9 that rides on cam followers 10a, 10b in a track formed between wear plates 11a, 11b and a housing 13 mounted on a suitable carousel structure 8a. The piston carousel 8 and carousel support structure 8a are conventional and available from Ferguson Machine Company, 11820 Lackland Road, St. Louis, Mo. 63146.

The piston carousel 8 traverses past the piston-ringing apparatus (station) shown in FIG. 1 via the upper and lower cam followers 10a, 10b. Each slide 6 is movable downwardly to allow the piston thereon to be lowered to the ringing apparatus for assembly of the intermediate ring IR into the intermediate piston groove 3 in manner to be described. Similarly, an outermost cast iron or steel compression ring (not shown) can be assembled in the outer piston groove 5 using a like ringing apparatus as shown in FIG. 1. In addition, a corrugated expander ring ER (shown in FIG. 2) can be assembled into the piston inner groove 7 using a similar ringing apparatus as shown in FIG. 1 with a relatively minor modification to be explained below. First and second thin, spring steel rail rings RR (also shown in FIG. 2) can be assembled in the inner piston groove 7 on opposite sides of the expander ring ER using a rail ringing apparatus (station) described and shown in copending U.S. patent application Ser. No. 08/138,475 of common assignee herewith.

Typically, each piston P/pallet PL is conveyed by the piston carousel 8 from one ringing apparatus (station) to another. The piston P/pallet PL is lowered via the slide 6 to the particular ringing station to this end. The pallet PL includes a rotatably mounted cam follower 121 that rides on a fixed rail PR above the carousel 8 to support the pallet PL in vertical orientation during transfer from one station to another. The rail PR is interrupted at each ringing station to allow lowering of the piston P/pallet PL via slide 6 at each station. In particular, at each ringing station, the slide 6 is transferred to a partial rail section (not shown) that is contiguous with rail PR and is lowerable/raiseable by a conventional pneumatic actuator (not shown) to effect piston ringing and then raising of the ringed piston for conveyance on rail PR to the next ringing station.

In particular, each piston P is conveyed first to an expander ringing apparatus (station) to assemble the expander ring ER in the inner piston groove 7, and then to first and second rail ringing apparatus (stations) to assemble the rail rings RR in groove 7 on opposite sides of the expander ring ER as described in the aforementioned copending, commonly assigned patent application. After the expander ring ER and rail rings RR are assembled in the inner piston groove 7, each piston P is conveyed by the carousel 8 and lowered on slide 6 to the intermediate ringing apparatus (station) of FIG. 1 to assemble the intermediate compression ring IR in the piston groove 3 and then to the outer compression ringing apparatus (station) to assemble the outer compression ring in the outer piston groove 5.

The aforementioned rail ringing apparatus can be constructed differently from the compression ringing apparatus and expander ringing apparatus in accordance with this invention in order to assemble the thinner rail rings in the piston groove 7 without "oil canning" of the rail rings. The various expander, rail, and compression ringing apparatus (stations) are arranged and used in series relative to the piston carousel 8 in order to install the expander, rail, and compression rings in the piston grooves 3, 5, and 7.

Referring now to FIGS. 1-4, the ringing apparatus 10 for assembling the intermediate compression ring IR in the piston groove 3 is shown as comprising an upstanding elongated, tubular piston locating or nest member 10 for receiving and engaging each piston P in a manner to locate the intermediate piston groove 3 in a predetermined ring-receiving position. The piston nest member 10 includes an outer nest surface or periphery 12 for storing a stack of the rings IR end-to-end along its length or axis. In particular, the nest member 10 includes a lower, cylindrical section 12a with a constant diameter that is slightly less than the inner diameter of the compression rings IR and an upper section 12c fastened by screws 13 to the lower section 12a. The upper section 12c includes an upwardly diverging conical periphery 12d for expanding the compression rings IR and an uppermost, cylindrical periphery 12e with a constant diameter equal to the largest diameter of the conical periphery 12d to maintain the compression rings IR in the expanded condition prior to their being assemblied into the groove 3 of each successive piston P received in the piston nest member 10.

The lower, cylindrical section 12a includes an anti-drop vane 12f to expand the compression rings IR slightly enough to prevent their falling downwardly off the piston nest member 10 when a ring cartridge 30 is not engaged thereto in the manner described below.

The piston nest member 10 includes an annular first end 14 at the termination of the upper nest section 12c. The first end 14 defines an end lip 12e and is aligned proximate the intermediate piston groove 3 as shown best in FIG. 4 when each successive piston P is received in the piston nest member 10. The piston nest member 10 includes a lower second end 16 remote from the first end 14. The piston nest member 10 is mounted by a narrow, upstanding vane or plate 18 to a fixed support structure 20 of the ringing apparatus. The vane or plate 18 is aligned to receive the gap in the compression rings IR to guide the rings in a common orientation (gap facing to the left in FIG. 2) as they are fed along the nest member 10 from the second end 16 toward the first end 14 thereof. For illustration, a typical gap is ¼ inch wide for a free ring.

The annular first end 14 is defined by an upper, open end of the tubular nest member 10 that forms an upwardly facing, cup-shaped recess 22 in the piston nest member 10. An annular spacer member or means 24 is disposed and fastened by screws 25 on the bottom annular shoulder of the recess 22. The thickness of the spacer member 24 is selected so as to position the bottom of the intermediate piston groove 3 generally coplanar with the top end lip 12e of the nest member 10 when the piston dome PD engages the spacer member 24, FIG. 4, so as to receive a compression ring R that is advanced or fed along the nest periphery 12 past the lip 12e where the expanded compression ring can spring or contract into the piston groove 3. Thus, the piston groove 3 is located in a ring-receiving position by the spacer member 24 when the piston P is received in the recess 22 with the dome PD engaged against the spacer member 24. The spacer member 24 has an upper surface configured (e.g. recessed) to accommodate the dome PD of the piston P as shown best in FIG. 4.

The second end 16 of the nest member 10 includes a pilot member 26 fastened thereto by screw 28. The pilot member 26 has an outer diameter selected to pilot and align a ring cartridge 30 (ring supply cartridge) with the nest member 10, FIG. 2. In particular, the outer diameter of the pilot member 26 is selected to receive the end of the ring cartridge 30 and position the longitudinal axis of the ring cartridge 30 coaxially with the longitudinal axis of the nest member 10. The piston nest member 10 and the ring cartridge 30 are thereby aligned end-to-end so that compression rings IR can be supplied from the ring cartridge to the nest member during the ringing operation. As is apparent, the outer diameters of the nest member 10 and ring cartridge 30 are substantially equal to this end.

Figure 5:
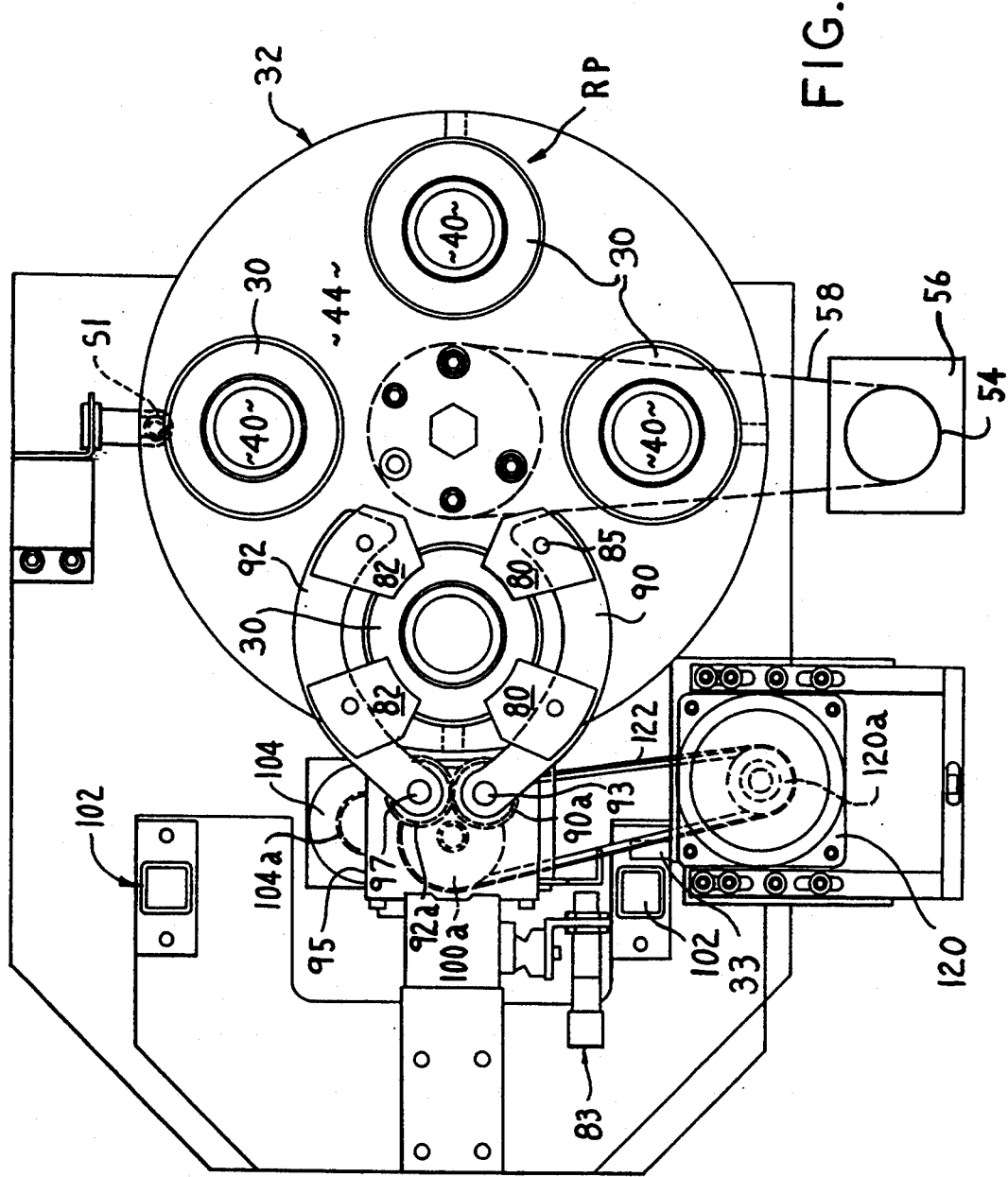
FIG. 5 is a plan view of the ring cartridge carousel and the ring feeding fingers and finger drive mechanism.
Figure 6:
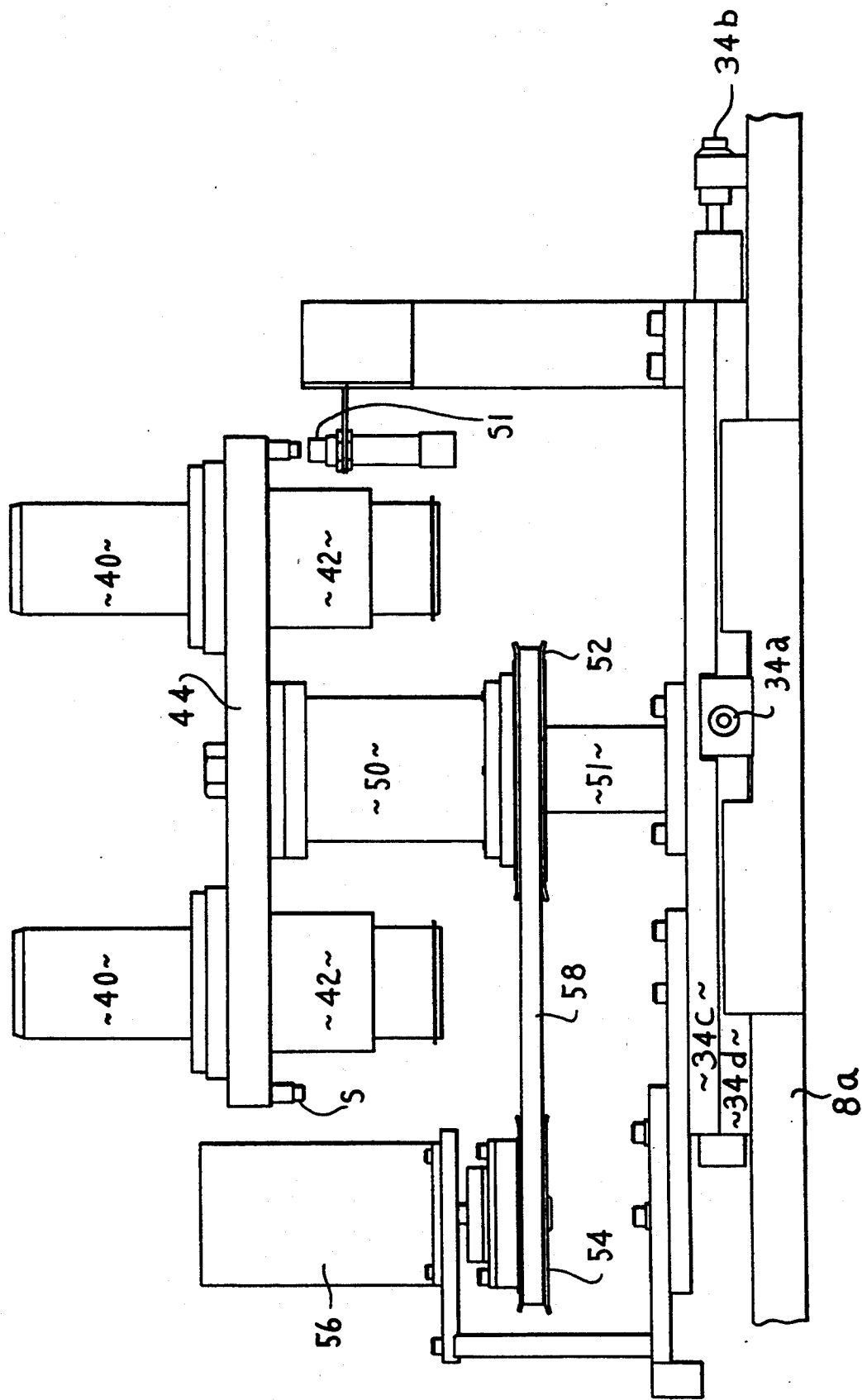
FIG. 6 is a side elevational view of the ring cartridge carousel.

Referring to FIGS. 1 and 5, a plurality of ring cartridges 30 are shown positioned on rotatable carousel 32 mounted on a base 34 of the ringing apparatus. Adjustment screw mechanisms 34a, 34b are provided to initially adjust the position of the station base 34c relative to the piston P on the pallet PL.

Each ring cartridge 30 includes an upstanding tubular storage member 36 having a stack of the compression rings IR disposed end-to-end along its length (only some of the rings IR being shown in full elevation for clarity). Each ring storage member 36 includes an upstanding vane or plate 38 that receives the gap of the compression rings IR to guide the rings in a common orientation (gap facing to the left in FIGS. 1 and 5) as they are fed upwardly along ring cartridge 30 toward the nest member 10. This ring orientation is the same as the ring orientation provided on the piston nest member 10 by aforementioned vane or plate 18 so that a smooth transition or feeding of the rings from the ring cartridge 30 to the nest periphery 12 is provided. A notch in the orientation vane 38 and the vane 18 mesh at the respective female/male regions shown in FIG. 2 to achieve proper alignment thereof.

Each ring cartridge 30 includes an enlarged end collar 30a on which the stack of compression rings IR is supported. Typically, the compression rings IR are manually loaded onto each ring cartridge 30.

Each ring cartridge 30 includes an open lower end that is received in a respective upstanding cylindrical cartridge support member 40 movably mounted in a respective bushing 42 fixedly disposed on the plate 44 of the carousel 32. As shown best in FIG. 1, the end collar 30a of each ring cartridge 30 rests on a support collar 45 fixed on each support member 40. As a result, each support member 40 and the ring cartridge 30 thereon can be raised or lowered with respect to the bushing 42.

The carousel plate 44 is rotatably mounted by a hollow shaft 50 on a fixed upstanding post 51 mounted on the apparatus base 34 as shown best in FIG. 1. The shaft 50 includes a pulley 52 thereon that is drivingly connected to a drive pulley 54 of an electrical drive motor 56 by a drive belt 58. The carousel 32 is thereby rotatable about the upstanding axis defined by the post 51.

Referring to FIGS. 1 and 5, the carousel 32 is shown including four ring cartridges 30 mounted on the carousel plate 44 in the manner described above. The carousel 32 is positioned beneath and offset from the piston nest member 10 with the rotational axis of the carousel parallel to the longitudinal axis of the piston nest member 10.

The carousel 32 is rotated or indexed by motor 56 to position each ring cartridge 30 successively one at a time beneath and in axial alignment with the piston nest member 10 as shown in FIG. 1 (i.e. the longitudinal axes of the nest member 10 and the ring cartridge 30 therebelow are coaxial) at a ring cartridge supply position SP. The carousel 32 and associated components thus comprise means for positioning one of the ring cartridges at a time in alignment with the piston nest member 10.

Figure 2:
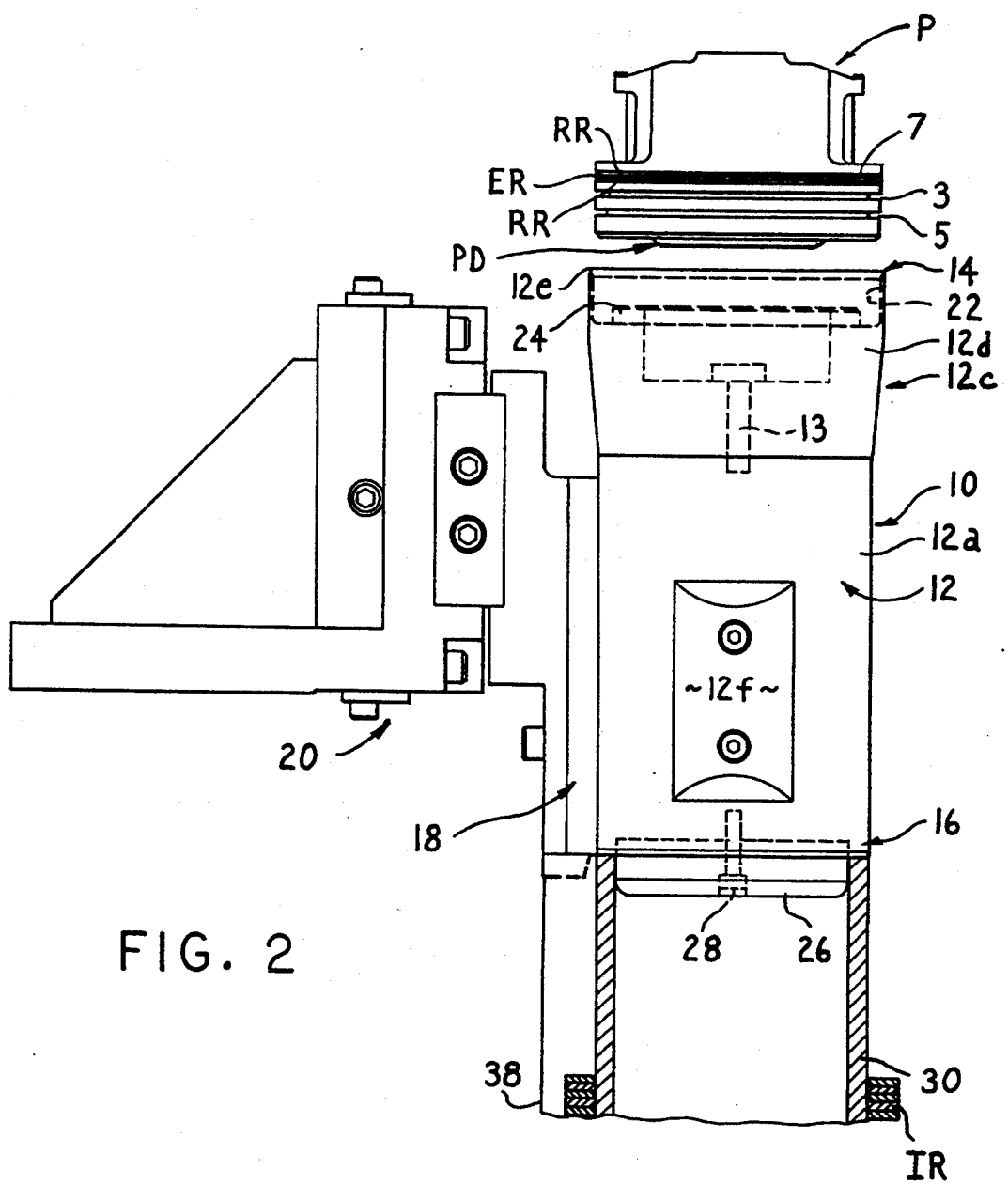
FIG. 2 is an enlarged side elevation of the piston nest member.
Figure 3:
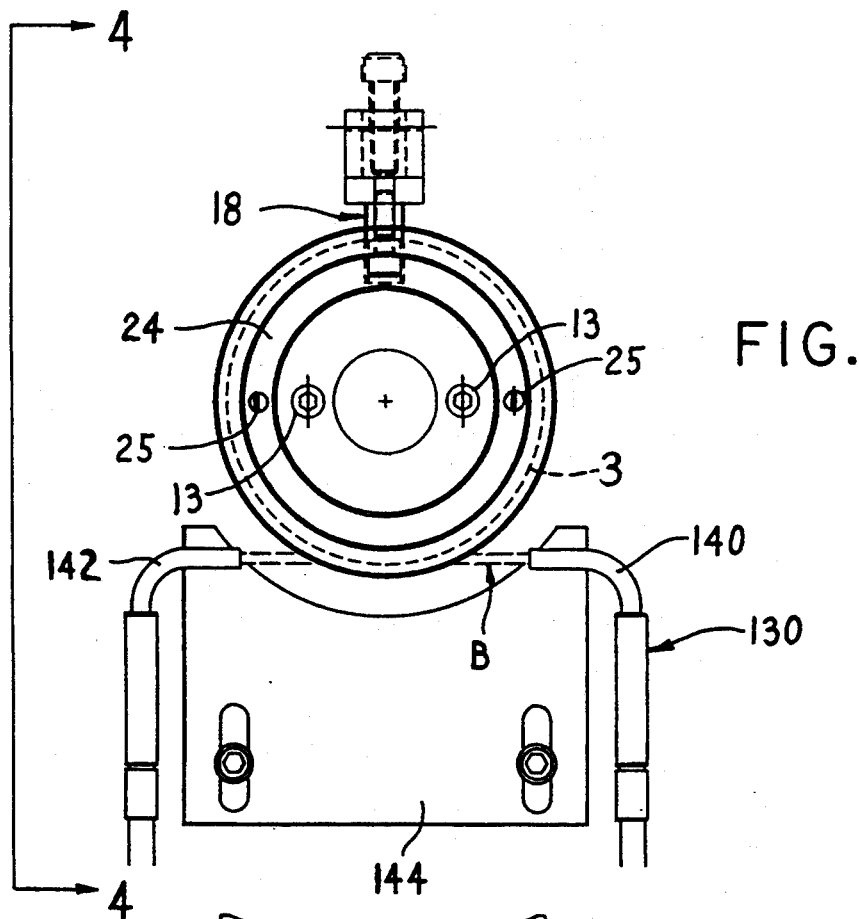
FIG. 3 is a plan view of the piston nest member of FIG. 2.

The ring cartridge 30 aligned beneath the piston nest member 10 is raised and held by a lifting mechanism 60 so as to engage the upper end of the aligned ring cartridge 30 with the lower, second end 16 of the piston nest 10, FIG. 2, to permit transfer or feeding of the compression rings IR from the ring cartridge to the piston nest.

In engaging the lower end 16 of the piston nest 10, the upper end of the ring cartridge 30 is piloted by the pilot member 26 as shown in FIG. 2. When the aligned ring cartridge 30 is empty of rings, the mechanism 60 lowers the ring cartridge 30 so as to disengage it from the lower end 16 of the piston nest member 10.

Figure 7:
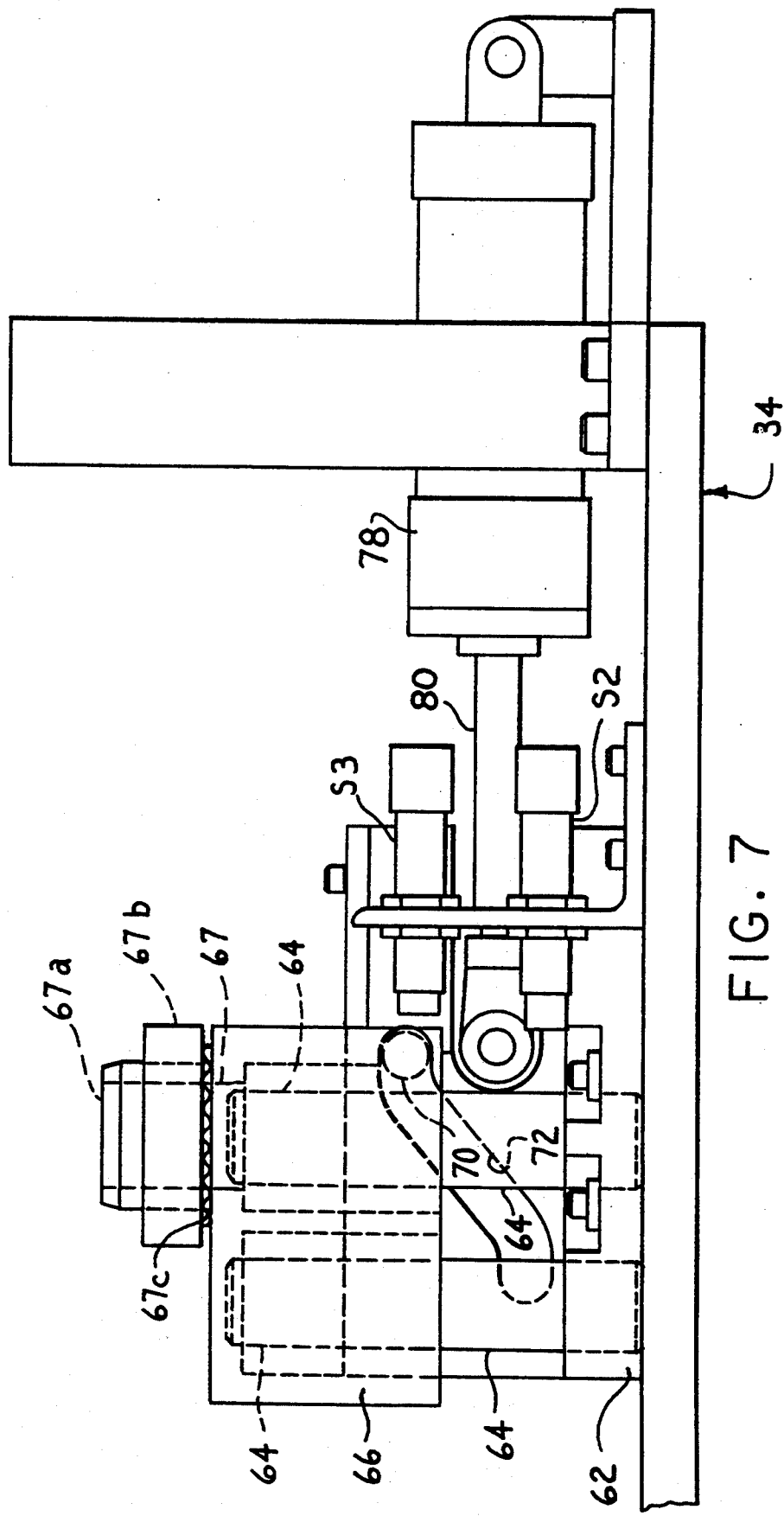
FIG. 7 is a side elevational view of the ring cartridge lift mechanism.
Figure 8:
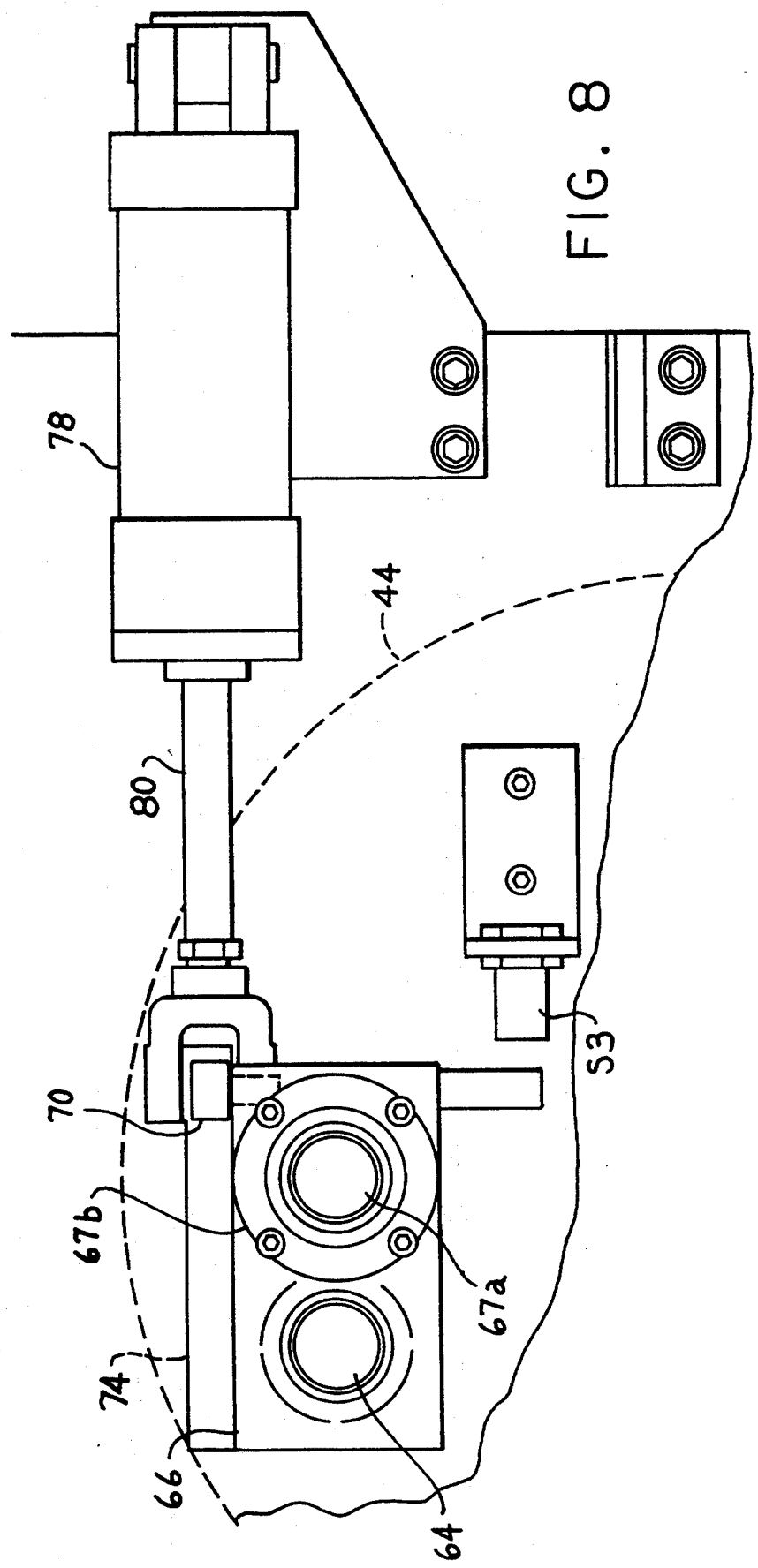
FIG. 8 is a partial plan view of the ring cartridge lift mechanism of FIG. 7.
Figure 9:
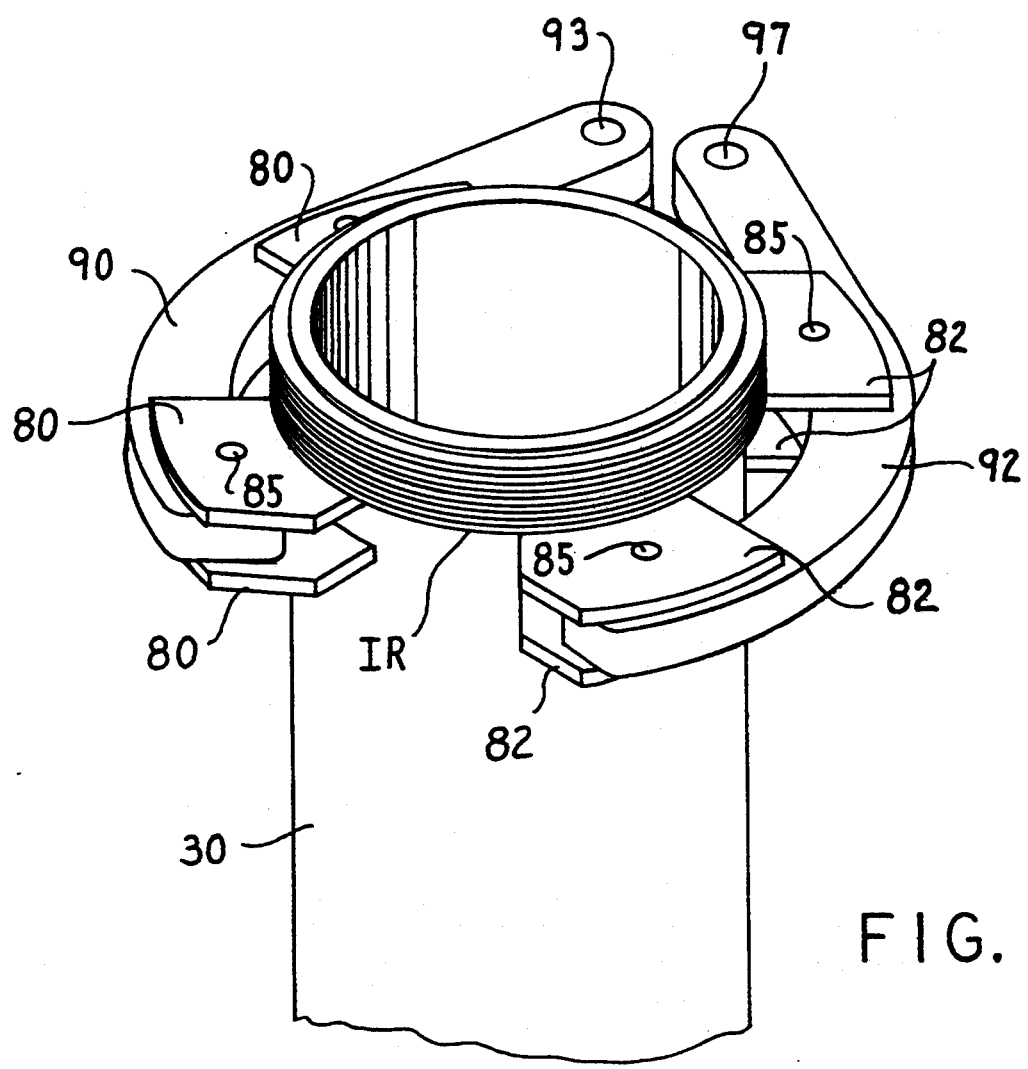
FIG. 9 is a partial perspective view showing the feeding fingers engaged to the bottom of the stack of rings on the ring cartridge to feed them to the piston nest.

The mechanism 60 for raising/lowering the aligned ring cartridge 30 to engage/disengage from the piston nest member 10 is shown in detail in FIGS. 7 and 8. The mechanism 60 comprises a lower fixed housing 62 mounted on the base 34 of the ringing apparatus adjacent the carousel 32. The housing 62 includes guide posts 64 that guide an upper housing 66 for up and down movement relative to the fixed housing 62. The upper housing 66 carries a shaft 67 that includes an upper end 67a adapted to enter and engage the lower end of the ring cartridge 30 aligned beneath the piston nest member 10. The upper shaft end 67a includes a support collar 67b fastened thereon to support the ring cartridge 30 as it is raised and lowered relative to the nest member 10. A spring washer 67c is disposed beneath the collar 67b.

The upper housing 66 is moved up or down by a cam drive mechanism comprising a cam follower 70 connected to the upper housing 66 and a cam track 72 defined by a cam track member 74 connected to the side of the lower fixed housing 62. The cam follower 70 is caused to traverse the cam track 72 by a fluid (pneumatic) cylinder 78 and cylinder rod 80. In particular, the cylinder rod 80 is connected to the cam track member 74 to move the cam track to the left or right in FIG. 7 between the upper and lower cam follower positions shown. Movement of the cam track member 74 to the left position shown will raise the upper housing 66 and attached shaft 67 and thus the ring cartridge 30 thereon. 10 Movement of the cam track member 74 to the right position will lower the upper housing 66 and attached shaft 67 and thus the ring cartridge 30 thereon.

The lift mechanism 60 is adapted to raise the ring cylinder 30 aligned beneath the piston nest member 10 upwardly a distance to engage the upper end of the ring cartridge 30 with the lower end 16 of the piston nest as guided by the pilot member 26, FIG. 2. This engagement is maintained by the mechanism 60 to permit transfer or feeding of the compression rings IR from the ring cartridge 30 to the piston nest member 10 until the cartridge is empty of rings.

When the ring cartridge 30 is empty of rings, the lift mechanism 60 lowers the empty ring cartridge 30 to rest on the carousel plate 44. In particular, the empty ring cartridge is lowered until it is supported on the carousel plate 44. The carousel 32 is then rotated to bring another ring cartridge 30 full of compression rings IR into alignment beneath the piston nest member 10, and the lift mechanism 60 raises the replacement ring cartridge 30 into engagement with the lower end 16 of the piston nest member 10 in the manner described above to provide an additional supply of compression rings IR thereto.

The empty ring cartridge 30 is eventually rotated or indexed by 90° incremental rotation of carousel 32 to a position RP remote from the lift mechanism 60 where the empty ring cartridge can be replaced with a ring cartridge full of compression rings IR.

Once the aligned ring cartridge 30 is engaged to the lower end 16 of the piston nest member 10 as described above and shown in FIGS. 1 and 2, the compression rings IR can be fed from the engaged ring cartridge 30 to the nest periphery 12 for assembly into the groove 3 of each piston P successively located in the piston nest 10. In particular, means is provided for moving the stack of compression rings IR along the ring cartridge 30 and the nest periphery 12 to position an endmost compression ring IR in the groove 3 of each successive piston P received in the piston nest member 10. This occurs until the cartridge is empty of rings IR. When the engaged ring cartridge 30 is empty of rings, it is disengaged from the nest for replacement by another ring cartridge full of rings in the manner described above. During this time, the ring moving means remains operable to move the stack of compression rings IR remaining on the outer periphery 12 of the piston nest member 10 to position an endmost compression ring IR remaining thereon in the groove 3 of each successive piston P received in the nest member 10. In this way, there is no interruption in the ringing of successive pistons P when an empty ring cartridge is disengaged from the piston nest for replacement with another ring cartridge full of rings from the carousel 32.

Figure 10:
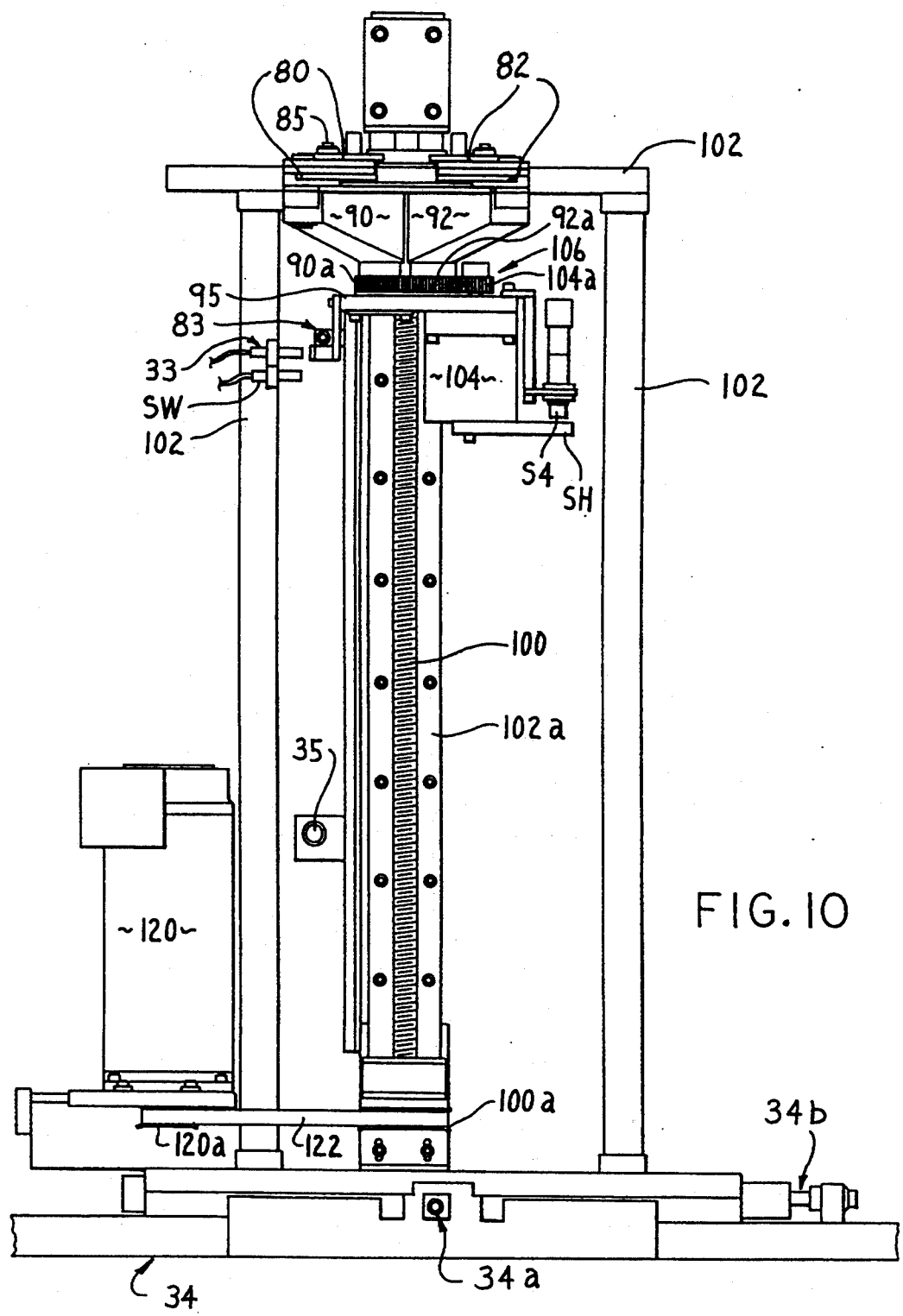
FIG. 10 is a front elevation of the ring feeding mechanism.

Referring to FIGS. 1, 5 and 9–10, the ring moving means comprises opposing pairs of identical ring-moving fingers 80, 82 for engaging the end of the stack of compression rings IR on the engaged ring cartridge 30 or nest periphery 12 (in the event the ring cartridge is empty and is being replaced with a full ring cartridge from the carousel 32). The fingers 80, 82 are pivotally mounted by pins 85 on respective arms 90, 92 that, in turn, are pivotally mounted by pivot pins 93, 97 on a carriage 95. The carriage 95 is movable on an upstanding ball screw 100 mounted by upper and lower flanges 101a, 101b on the support post 102a of the ringing apparatus. Frame 102 is mounted on the base 34 of the ringing apparatus as shown in FIGS. 1 and 10.

The carriage 95 includes a ball nut 110 mounted thereon and is moved up or down by suitable rotation of the ball screw 100. The ball screw 100 is rotated by an electrical stepping motor 120 via a drive belt 122 extending between the motor pulley 120a and a driven pulley 100a of the ball screw 100. Rotation of the ball screw 100 in one direction raises the carriage 95 and rotation of the ball screw 100 in the other direction lowers the carriage 95.

The arms 90, 92 are opened and closed relative to the ring cartridge 30 or piston nest member 10 by a rotary actuator 104 and associated gear train 106 mounted on the carriage 95 shown best in FIG. 10. In particular, a drive gear 104a of the rotary actuator drives spur gears 90a, 92a on the arm pivot pins 93, 97. The outward movement of the arms 90, 92 is controlled by a positive stop (not shown).

When the arms 90, 92 are opened, the fingers 80, 82 are moved out of engagement with the bottom of the stack of compression rings IR. When the arms 90, 92 are closed, the fingers 80, 82 are brought into engagement beneath the stack of compression rings IR as shown best in FIG. 9 for rings IR on the ring cartridge 30. Similar engagement of the fingers 80, 82 is achieved beneath the stack of rings IR residing on the piston nest member 10 when an empty ring cartridge is being replaced with another ring cartridge full of rings IR from the carousel 32.

The stepping motor 120 is actuated by a control unit 160 (FIG. 11) in dependence on a signal provided by a switch (not shown) associated with the lowering/raising mechanism for slide 6 indicating that a piston P is fully inserted and received in the recess 22 of the piston nest member 10. Also, the stepping motor 120 is actuated only upon receiving an appropriate signal from fiber optic switch 130 shown in FIGS. 3–4 indicating that the piston groove does not have a compression ring therein. The stepping motor 120 is deactuated by the control unit 160 (FIG. 11) in dependence on a signal provided by the fiber optic switch 130 indicating that a compression ring IR has been positioned in the piston groove 3.

In particular, the switch associated with the slide lowering/raising mechanism and the fiber optic switch 130 provide signals to cause control unit 160 to actuate stepping motor 120 to move the carriage 95 and the fingers 80, 82 thereon engaged with the bottom of the stack of rings IR a sufficient distance upwardly to displace a compression ring R residing at the upper nest end 12 past the end lip 12e and into the piston groove 3. The stepping motor 120 is deactuated in dependence on a subsequent signal provided by the fiber optic switch 130 to the control unit 160 indicating that a compression ring IR has been positioned in the piston groove 3. The fiber optic switch 130 will be described below in more detail.

As mentioned above, when the ring cartridge 30 is empty of compression rings IR, it is disengaged from the lower end 16 of the piston nest member 10 for replacement by another ring cartridge full of rings from the carousel 32. The empty ring cartridge 30 is disengaged from the piston nest member 10 when the fingers 80, 82 have been advanced upwardly to the antidrop vane or plate 12f where a suitable switch 33, FIG. 10, is actuated indicating that the ring cartridge needs replacement. The fingers 80, 82 engage only the bottom of the stack of rings IR residing on the piston nest member 10 at this time.

During the time required to replace the empty ring cartridge with a full ring cartridge from the carousel 32, the fingers 80, 82 remain operable to engage the bottom of the stack of compression rings IR residing on the piston nest member 10 and in response to actuation of the stepping motor 120, to displace the stack of rings residing on the piston nest member sufficiently to displace the endmost ring IR past the lip 12e and into the groove 3 of each successive piston P received in the piston nest member during this time. In this way, there is no interruption in the ringing of five successive pistons when the empty ring cartridge is disengaged from the piston nest member for replacement with ring cartridge full of rings.

When the five additional rings have been installed on pistons, the control unit 160 will provide a signal for opening of the arms 90, 92. The arms 90, 92 are opened by the actuator 104 and gear train 106 to disengage the fingers 80, 82 from the stack of rings IR residing on the piston nest member 10. The carriage 95 is then rapidly lowered until switch 35 signals the control unit 160 that the fingers 80, 82 are fully lowered so that they are proximate the bottom of the stack of compression rings IR on the replacement ring cartridge 30 now engaged to the piston nest member. The arms 90, 92 are then closed by the actuator 104 and gear train 106 to engage the fingers 80, 82 and the bottom of the stack of rings IR on the replacement ring cartridge 30 so as to provide an additional supply of compression rings IR to the piston nest member 10 for successive pistons P received therein. The fingers 80, 82 are rapidly advanced by the ball screw 100 to urge the stack of rings R on the replacement ring cartridge 30 upwardly into engagement with the stack of remaining rings IR on the piston nest member 10. Another switch SW just below switch 33 senses the top of the new ring stack just before they contact those rings still on the nest member 10, and slows the lift of fingers 80, 82 to assembly speed. The ring stack then continues at slow assembly speed until the top ring jumps into the piston groove.

The fiber optic switch 130 referred to above directs an infrared light beam B through a portion of the piston groove 3 when the groove is positioned at the ring-receiving position to determine whether a ring is positioned in the groove. As is apparent from FIGS. 3–4, the infrared light beam B is directed tangentially relative to the circumference of the groove 3 by first and second fiber optic members 140, 142 mounted on a support plate 144 proximate the piston nest member 10. Support plate 144 is mounted on a suitable frame (not shown) to position the fiber optic switch 130 proximate the ringing station. The cable members 140, 142 communicate with a conventional source of infrared light 150. A conventional infrared fiber light source 150 and cable members 140, 142 can be used and obtained from Banner Engineering Corporation having address at 9714 10th Avenue, N., Minneapolis, Minn. 55441.

Figure 11:
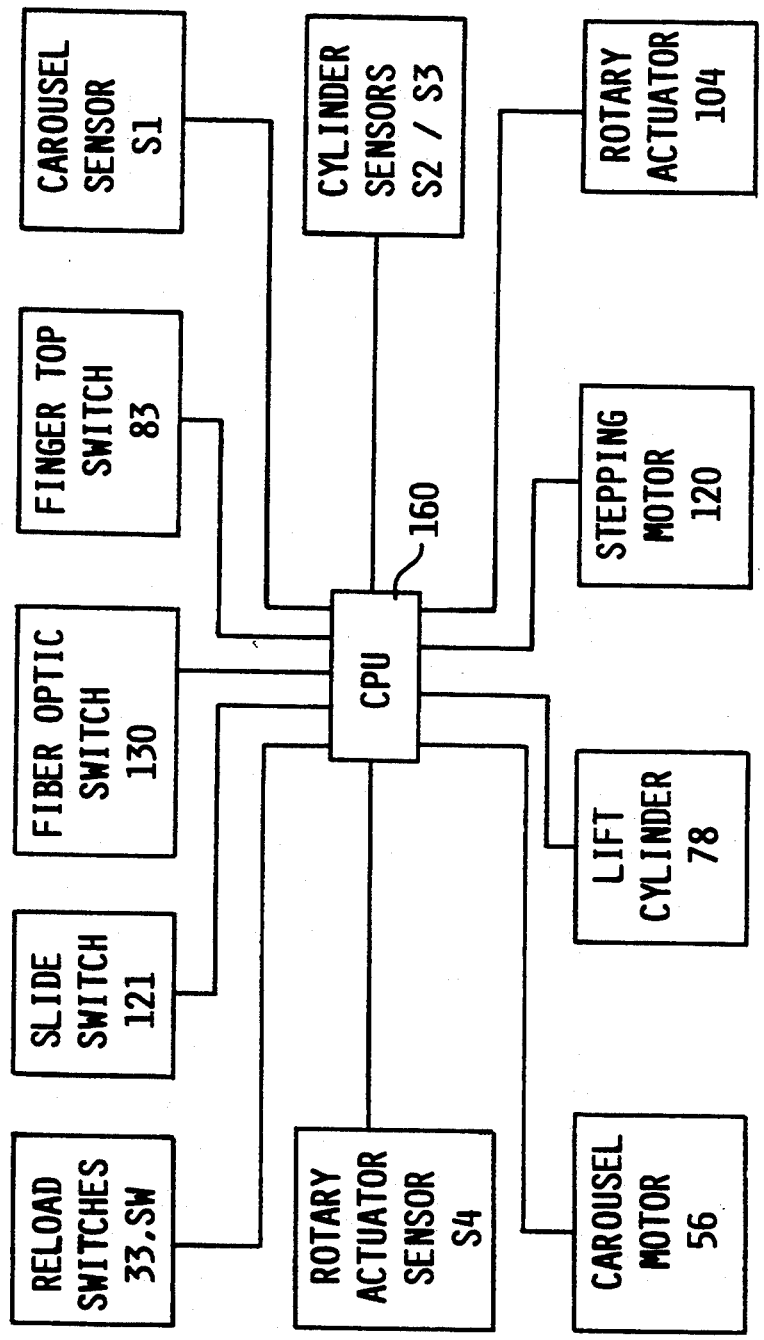
FIG. 11 is a diagrammatic view of a control system for the piston-ringing apparatus of FIG. 1.

Referring to FIG. 11, the fiber switch 130 provides a signal to a computer control unit 160 that controls deactuation of the stepping motor 120 to stop advancement of the stack of rings IR toward the end lip 12e when a compression ring IR is detected in the piston groove 3 by failure of the infrared light beam B to pass through the groove 3.

As shown in FIG. 11, the computer control unit 160 also controls actuation/deactuation of the drive motor 56 of the carousel 32 to supply ring cartridges 30 full of rings IR and remove empty ring cartridges relative to the lifting mechanism 60, the cylinder 78 of the lifting mechanism 60 to raise/lower the full/empty ring cartridges 30 relative to the piston nest 10, the rotary actuator 104 for opening/closing the ring feeding fingers 80, 82, and the ring feeding stepping motor 120 to feed the compression rings IR to the groove 3 of each successive piston P received in the piston nest 10. The computer control unit 160 controls these components in response to a piston P being located in the recess 22 of the piston nest member 10 with the groove 3 in the ring-receiving position. Suitable position feedback sensors S1, S2/S3, and S4 are associated with the carousel plate 44, movable lifting housing 66, and rotary actuator position-indicating arm SH to provide the desired automated sequential control of these components for changing of the ring cartridges.

Figure 4:
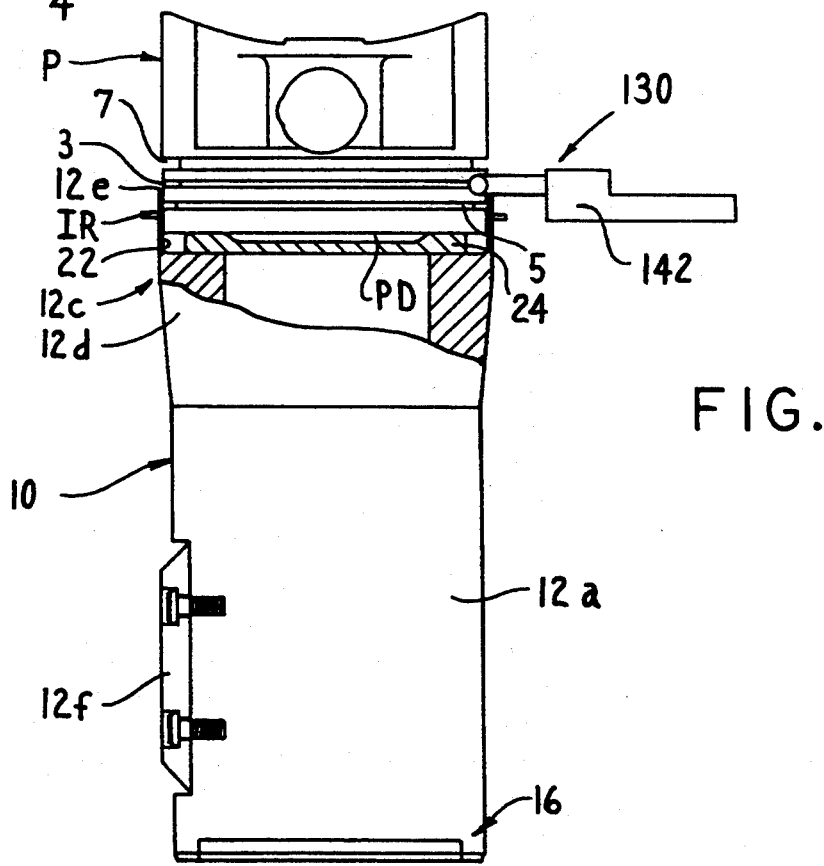
FIG. 4 is an elevational view of the piston nest member of FIG. 3 in the direction of arrows 4-4.

In operation, each piston P is positioned in the recess 22 of the piston nest member 10 with the piston dome PD engaged on the spacer member 24. This engagement locates the intermediate piston groove 3 at the ring-receiving position generally coplanar with the end lip 12e of the piston nest member as shown in FIG. 4. The switch associated with the slide lowering/raising mechanism provides a signal to computer control unit 160 that a piston P is fully inserted in the piston nest member 10 to locate the groove 3 at the ring-receiving position. The infrared beam of the fiber optic switch 130 passes tangentially through the piston groove 3 since no ring is present therein.

In response to signals from these switches, the stepping motor 120 is actuated by the control unit 160 to raise the stack of rings IR on the ring cartridge 30 engaged to the piston nest member 10 at a slow assembly speed (e.g. 0.1 inch/second) until an expanded endmost ring IR at the end lip 12e is displaced over the end lip 12e and snaps into the piston groove 3 at the ring-receiving position. When the endmost ring IR snaps into the piston groove 3, the infrared light beam B is broken and provides a signal to the control unit 160 that stops the stepping motor 120. The broken light beam also verifies that the ring IR did enter into the proper groove 3 and did not jump over the groove 3, hang up on the side of the piston P, or break and fall to the floor.

This sequence is repeated as each successive piston P is positioned in the recess 22 of the piston nest member 10 by the piston carousel 8 and associated slide 6 to assemble the intermediate ring IR into the groove 3.

When the fingers 80, 82 advance beyond the top of the ring cartridge 30 (indicating the cartridge is empty of rings IR), the switch 33 provides a signal to the control unit 160 that, in turn, actuates the cylinder 78 to lower the empty ring cartridge 30 onto the carousel 32. The carousel drive motor 56 is then commanded by the control unit 160 to rotate or index the carousel plate 44 to position a replacement ring cartridge 30 full of rings IR at load position SP aligned beneath the piston nest 10. The lifting cylinder 78 is then actuated by the control unit 160 to raise the replacement ring cartridge into engagement with the piston nest 10 to provide an additional supply of rings IR thereto. As the empty ring cartridge 30 is replaced with a full ring cartridge, the fingers 80, 82 continue to be advanced along the piston nest member 10 to feed compression rings IR residing on the nest member 10 to successive pistons P supplied to the piston nest member 10 by the respective slides 6. Thus, there is no interruption in ringing of pistons when the empty ring cartridge is replaced.

When five additional rings have been installed on successive pistons the control unit 160 actuates the rotary actuator 104 to open the fingers 80, 82 away from the nest member 10. The ball screw stepper motor 120 is controlled by the control unit 160 to rapidly (e.g. 6.25 inches/second) move the open fingers 80, 82 to the bottom of the stack of rings IR on the replacement ring cartridge 30 now engaged top the nest member 10. The control unit 160 commands the rotary actuator 104 to close fingers 80, 82 under the stack of rings IR so as to be in engagement with the stack to advance it rapidly upwardly toward the nest member 10 to meet the stack of rings IR remaining on the nest member 10. The switch SW just below switch 33 senses the top of the new ring stack just before they contact those rings still on the nest member 10, and slows the lift of fingers 80, 82 to assembly speed. The stepping motor 120 thereafter is controlled at the slower ring assembly speed employed to assemble the rings IR into the groove 3 of successive pistons P received in the piston nest member 10.

As mentioned above, each piston P is conveyed by the carousel 8 in succession to ringing apparatus (stations) to assemble the expander ring ER and rail rings RR in the inner piston groove 7, the intermediate compression ring IR in the intermediate piston groove 3, and a compression ring (not shown) in the piston groove 5.

As also mentioned above, the corrugated expander ring ER can be assembled into the piston oil ring groove 7 using a ringing apparatus like that shown in FIG. 1 with relatively minor modifications. In particular, a ringing apparatus in accordance with the invention for assembling the expander ring ER in the piston oil ring groove 7 will differ from that described above and shown in FIGS. 1–9 in having a thinner spacer member 24 disposed in recess 22 of the piston nest member 10 so as to position the bottom of the oil ring groove 7 generally coplanar with the end lip 12e of the piston nest member 10.

In addition, the expander rings ER typically are placed on ring cartridges 30 having an outer diameter slightly larger than the piston diameter so that the rings ER are in the expanded condition on the ring cartridges 30. The piston nest member 10 will have a lower section 12a and upper section 12c of the same diameter corresponding to the diameter of the ring cartridges 30 so that the expander rings ER will remain expanded to the same extent as they traverse the nest member 10. Thus, the piston nest member 10 will have a constant outer diameter from upper end 14 to lower end 16 equal to the outer diameter of the ring cartridges 30. Other than these differences, the ringing apparatus for assembling the expander rings ER in the piston oil ring grooves 7 will be the same in construction and function as that described and shown for the intermediate compression rings IR.

Similarly, a compression ring (not shown but similar to intermediate compression ring IR) can be assembled into the piston outer groove 5 using a ringing apparatus like that shown in FIG. 1 and differing therefrom only in employing a thicker spacer member 24 in the recess 22 of the piston nest member 10 in order to position the bottom of the groove 5 generally coplanar with the end lip 12e of the piston nest member 10. Other than this difference, the ringing apparatus for assembling the compression ring in the piston groove 5 will be the same in construction and function as that described and shown for the intermediate compression rings IR.

As mentioned above, the aforementioned rail ringing apparatus is different in construction from the compression ringing apparatus and expander ringing apparatus in accordance with this invention in order to assemble the thinner rail rings RR in the piston groove 7 without "oil canning" of the rail rings RR. The rail ringing apparatus (station) forms no part of this invention, although the various expander, rail, and compression ringing apparatus (stations) are arranged and used in series relative to the piston carousel 8 in order to install the expander, rail, and compression rings in the piston grooves 3, 5, and 7. The rail ringing apparatus (station) is described and shown in copending U.S. patent application Ser. No. 08/138,475 of common assignee herewith.

Although certain specific features and embodiments of the invention have been described hereinabove and shown in the drawings, it is to be understood that modifications and changes may be made therein without departing from the spirit and scope of the invention as defined in the appended claims.

The embodiments of the invention in which an exclusive property or privilege is claimed are defined as follows:

1. Apparatus for assembling a ring on each of successive pistons, comprising:
   a) a fixed piston nest member for receiving each piston and having piston engaging means for engaging each piston in a manner to locate a piston groove in a predetermined ring-receiving position, said nest member including an outer periphery for storing a stack of rings end-to-end thereon and having a cylindrical, tubular first end of constant outer diameter terminating in an end lip of constant distance from the piston engaging means proximate to which end lip the piston groove is positioned when each said piston is engaged to said piston nest member and a second end remote from said first end,
   b) a plurality of ring cartridges each including a stack of rings arranged end-to-end thereon along its length,
   c) means for positioning one of the ring cartridges at a time in alignment with the piston nest member,
   d) means for moving the aligned ring cartridge into engagement with said second end of the piston nest member to permit transfer of rings from the aligned ring cartridge to the piston nest member and to disengage the aligned ring cartridge when empty of rings, e) means for moving the stack of rings along the aligned ring cartridge toward said first nest member end to position an endmost ring residing on said nest periphery in the groove of each successive piston received in said nest member while said aligned ring cartridge is engaged to said nest member, said means being operable to move the stack of rings remaining on said nest periphery to position an endmost ring thereof in the groove of each successive piston at said ring-receiving position when said aligned ring cartridge empty of rings is disengaged therefrom for replacement by another ring cartridge full of rings, whereby there is no interruption in positioning of a ring on successive pistons when the aligned ring cartridge is disengaged from said nest member for replacement.

2. The apparatus of claim 1 wherein the piston nest member comprises a tubular member having an open end lip defining said first end and spacer means disposed in said first end for engaging an end of the piston to position the piston groove in said ring-receiving position.

3. The apparatus of claim 1 wherein said means for positioning one of the ring cartridges in alignment with said nest member comprises a carousel having a plurality of ring cartridges disposed thereon and rotatable to successively align one of the ring cartridges thereon with said piston nest member.

4. The apparatus of claim 1 wherein said means for relatively moving said ring cartridge and said nest member comprises a mechanism for raising/lowering the aligned ring cartridge to engage/disengage from the second end of the piston nest member.

5. The apparatus of claim 1 wherein said means for moving said rings on said ring cartridge and on said nest member comprises opposing fingers for engaging an end of the stack of rings on the ring cartridge when said cartridge is engaged to said nest member or on the nest periphery when said cartridge is disengaged from said nest member, and motor means for moving the fingers along said cartridge or nest member to feed the ring stack toward said first end.

6. The apparatus of claim 1 including fiber optic means proximate the piston nest member for directing a light beam through a portion of the groove of the piston received in said piston nest member for determining whether a ring is positioned in said groove.

7. The apparatus of claim 1 wherein the piston engaging means comprises a piston spacer disposed at a bottom of a recess of said first end that receives each successive piston.

8. Apparatus for assembling a ring on each of successive pistons, comprising:

a) a piston nest member for engaging each piston in a manner to locate a piston groove in a predetermined ring-receiving position, said nest member including an outer periphery for storing a stack of rings end-to-end thereon and having an annular first end proximate to which the piston groove is positioned when each said piston is engaged to said piston nest member and a second end remote from said first end, b) a plurality of ring cartridges each including a stack of rings arranged end-to-end thereon along its length, c) means for positioning one of the ring cartridges at a time in alignment with the piston nest member, d) means for relatively moving the aligned ring cartridge and the piston nest member to engage the aligned ring cartridge with said second end of the piston nest member to permit transfer of rings from the aligned ring cartridge to the piston nest member and to disengage the aligned ring cartridge when empty of rings, e) means for moving the stack of rings along the aligned ring cartridge toward said first nest member end to position an endmost ring residing on said nest periphery in the groove of each successive piston received in said nest member while said aligned ring cartridge is engaged to said nest member, said means for moving said rings comprising opposing fingers for engaging an end of the stack of rings on the ring cartridge when said cartridge is engaged to said nest member or on the nest periphery when said cartridge is disengaged from said nest member, and motor means for moving the fingers along said cartridge or nest member to feed the ring stack toward said first end., said means for moving said rings being operable to move the stack of rings remaining on said nest periphery to position an endmost ring thereof in the groove of each successive piston at said ring-receiving position when said aligned ring cartridge empty of rings is disengaged therefrom for replacement by another ring cartridge full of rings, whereby there is no interruption in positioning of a ring on successive pistons when the aligned ring cartridge is disengaged from said nest member for replacement.

9. The apparatus of claim 8 wherein said opposing fingers are disposed on a platform movable toward/away from said nest member.

10. The apparatus of claim 9 wherein means is disposed on said platform for moving the fingers toward/away from the ring cartridge and nest member to engage/disengage the end of the ring stack.

11. The apparatus of claim 8 further including fiber optic switch means for directing a light beam through a portion of the piston groove at the ring-receiving position to determine whether a ring is positioned in the piston groove, said switch means providing a signal to deactuate the motor means to stop feeding of the stack of rings toward said first end when a ring is present in the piston groove.

12. Apparatus for assembling a ring on each of successive pistons, comprising:

a) a piston nest member for engaging each piston in a manner to locate a piston groove in a predetermined ring-receiving position, said nest member including an outer periphery for storing a stack of rings end-to-end thereon and having an annular first end proximate to which the piston groove is positioned when each said piston is engaged to said piston nest member and a second end remote from said first end, b) a plurality of ring cartridges each including a stack of rings arranged end-to-end thereon along its length, c) means for positioning one of the ring cartridges at a time in alignment with the piston nest member, d) means for relatively moving the aligned ring cartridge and the piston nest member to engage the aligned ring cartridge with said second end of the piston nest member to permit transfer of rings from the aligned ring cartridge to the piston nest member and to disengage the aligned ring cartridge when empty of rings, e) means for moving the stack of rings along the aligned ring cartridge toward said first nest member end to position an endmost ring residing on said nest periphery in the groove of each successive piston received in said nest member while said aligned ring cartridge is engaged to said nest member, said means being operable to move the stack of rings remaining on said nest periphery to position an endmost ring thereof in the groove of each successive piston at said ring-receiving position when said aligned ring cartridge empty of rings is disengaged therefrom for replacement by another ring cartridge full of rings, whereby there is no interruption in positioning of a ring on successive pistons when the aligned ring cartridge is disengaged from said nest member for replacement, and f) fiber optic means proximate the piston nest member for directing a light beam through a portion of the groove of each piston at said ring-receiving position for determining when a ring is positioned in said groove.

13. The apparatus of claim 12 wherein said fiber optic means directs the light beam tangentially relative to a circumference of the groove.

14. The apparatus of claim 12 wherein said fiber optic means comprises first and second fiber optic members aligned to direct the light beam tangentially through the groove.

* * * * *